United States Patent [19]
Brusich

[11] 4,017,063
[45] Apr. 12, 1977

[54] FOOD PROCESSING BOARD

[76] Inventor: Joseph J. Brusich, 2702 N. Hudlow Court, Tucker, Ga. 30084

[22] Filed: Oct. 28, 1975

[21] Appl. No.: 626,614

[52] U.S. Cl. .............................................. 269/302.1
[51] Int. Cl.² ......................................... A47J 43/00
[58] Field of Search .............. 269/302.1, 302, 296, 269/289

[56] References Cited
UNITED STATES PATENTS

| | | | |
|---|---|---|---|
| 624,797 | 5/1899 | Harris | 269/302.1 |
| 951,785 | 3/1910 | McQuinn | 269/302.1 |
| 1,315,101 | 9/1919 | Ehrke | 269/289 |
| 2,285,148 | 6/1942 | Czajka | 269/302 |
| 2,727,569 | 12/1955 | Patterson | 269/297 |
| 3,371,694 | 3/1968 | Miller | 269/289 |

FOREIGN PATENTS OR APPLICATIONS 243,967  8/1946  Switzerland ....................... 269/296

Primary Examiner—Al Lawrence Smith
Assistant Examiner—Robert C. Watson

[57] ABSTRACT

An adjustable board for use in a food processing operation, such as scaling, cleaning or filleting a fish, wherein the board includes a working surface for supporting a food product and clamp means for holding the food product on the working surface during a processing operation. The board is constructed to include two sections slidably connected to each other and longitudinally adjustable for varying the length of the board working surface.

4 Claims, 4 Drawing Figures

FOOD PROCESSING BOARD

BACKGROUND OF THE INVENTION

This invention relates to a food product processing apparatus and is more particularly concerned with an improved fish processing board.

During the scaling, cleaning or filleting of a fish, one of the most difficult tasks is the job of holding the fish during the processing operation and of changing the working position during the processing stages.

The prior art includes a fish handling board having a working surface and clamp means adjacent one end for holding the fish in a selected position on the board. However, since fish to be processed vary greatly in length or size, the standard size board is often of no use in handling larger fish. The economics and logistics of having several size boards are unworkable.

SUMMARY OF THE INVENTION

The above indicated disadvantages have been overcome by the present invention which basically includes a processing board having means for adjusting the size of the supporting surface.

It is therefore a primary object of the present invention to provide a fish processing board having fish clamping means adjacent one end and including means for adjusting the effective length of the board.

An additional object of the present invention is to provide an adjustable food processing board which is simple in construction and use, economical to manufacture, and reliable in performance.

These and other objects and advantages of the details of construction will become apparent after reading the following description of the illustrative embodiment with reference to the attached drawings.

DESCRIPTION OF THE ILLUSTRATIVE EMBODIMENT

Figure 1:
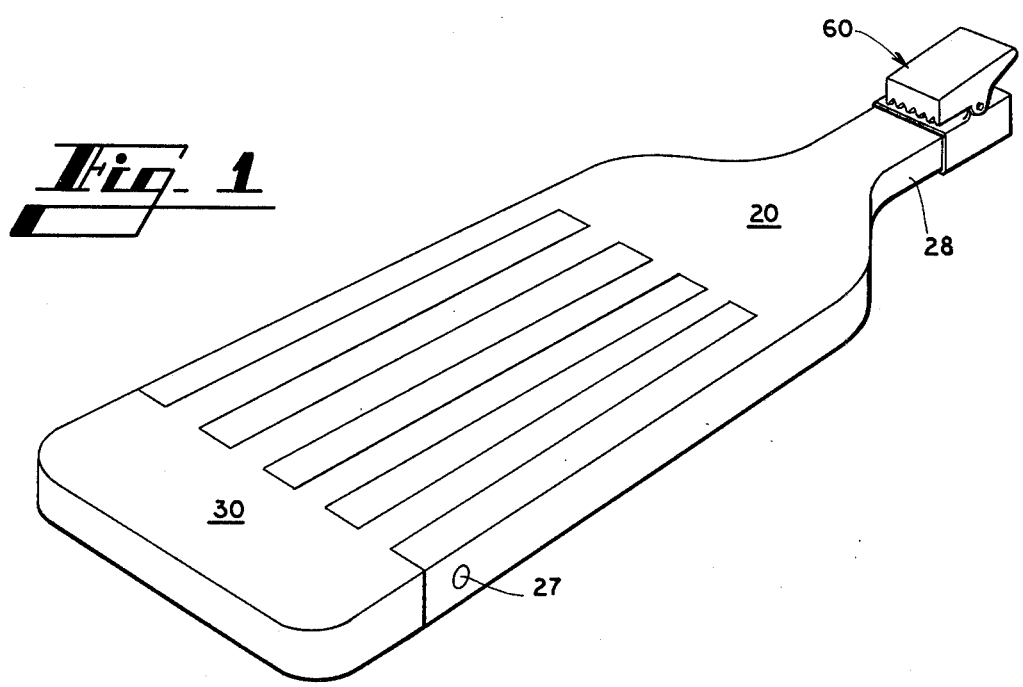
FIG. 1 is a perspective view of a food processing board embodying the principles of the present invention.
Figure 2:
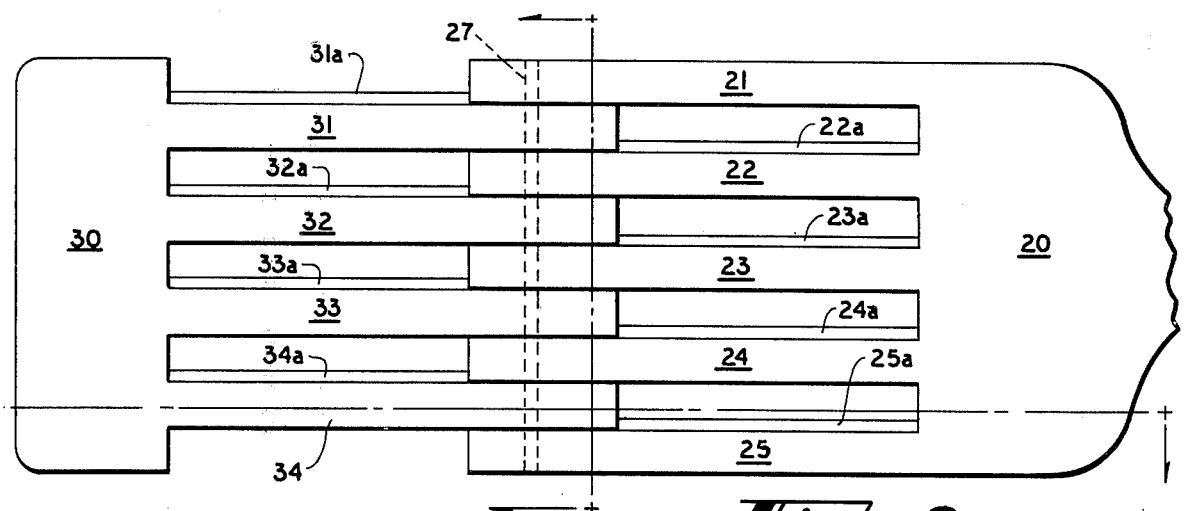
FIG. 2 is a top plan view of the food processing board shown in an adjusted position.
Figure 3:
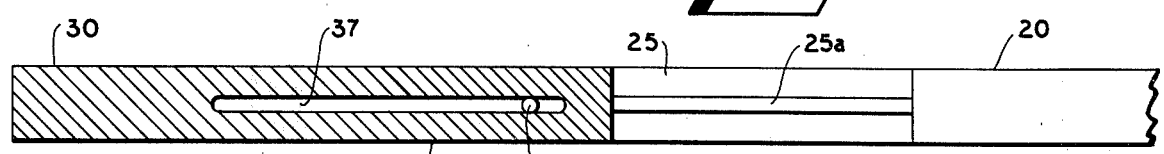
FIG. 3 is a vertical sectional view taken along lines 3—3 of FIG. 2.
Figure 4:
FIG. 4 is a vertical sectional view taken along lines 4—4 of FIG. 2.

Referring to the drawings, the food processing board embodying the features of the present invention is generally represented by the reference number 10 and will be described with reference to a base working surface 20 and food product clamp means 60.

As in the drawings, the base working surface 20 is constructed of two sections 20, 30, with each section including a plurality of spaced elements 21-25 and 31-34, respectively. The spaced elements 21-25 and 31-34 are alternately spaced and slidably connected to each other for sliding adjustment by conventional tongue-and-groove guide means 21a, b, etc., and 31a, b, etc. The spaced elements 21-25 and 31-34 are secured to their respective base sections 20, 30 in coplanar relationship, and are dovetailed, when connected together, to define a substantially planar upper working surface on which food products, such as fish, can be supported while being processed.

The effective length of the food processing board is limited by a stop pin 27 which extends transversely through, and is secured in the extended ends of spaced elements 21-25. Spaced elements 31-34 are each provided with elongated slots 37 through which pin 27 extends. Pin 27 and slots 37 will permit limited longitudinal adjustment of the board base sections relative to each other and will provide stop means to prevent the base sections from being accidentally displaced from each other.

As shown in FIG. 1, the board base section 20 includes an extended reduced neck portion 28 which is provided with conventional food product clamp means 60, which is secured thereto and is used to hold food products being processed in place on the board sections 20, 30, during a processing operation.

It now becomes apparent that the above described illustrative embodiment is capable of obtaining the above stated objects and advantages. It is obvious that those skilled in the art may make modifications in the details of construction without departing from the spirit of the invention which is to be limited only by the scope of the appended claims.

What is claimed is:

1. An expandable food product processing board comprising a first section including a plurality of elongated parallel projections defining elongated spaces therebetween, a second section including a plurality of elongated parallel projections defining elongated spaces therebetween, with the lengths of the projections of each section being slidably received along the lengths of the spaces of the other section and with the opposite sides of the projections forming opposite flat coplanar surfaces of the processing board, the projections and spaces of each of said sections being of lengths so that the projections of each section substantially fill the spaces of the other section when the sections are moved together, whereby when the sections are expanded apart the projections of each section withdraw from the spaces of the other section and maintain flat working surfaces on opposite surfaces of the processing board, stop means for limiting the distance of the sections can withdraw from each other, and clamp means mounted on one of said sections for holding a food product on said board.

2. The expandable food product processing board of claim 1 and wherein the elongated parallel projections of each section include mating tongues and grooves extending along their lengths to maintain the sections in sliding connection with each other.

3. An improved apparatus as defined in claim 1, further comprising limit stop means including a transverse rod means supported by one of said sections and extending through elongated slot means defined in said projections of said other section.

4. An improved apparatus as defined in claim 1, wherein said base is substantially rectangular in configuration and includes a longitudinally extending handle portion.

* * * * *